Sept. 28, 1943.    G. WEICHE    2,330,650
CHARGE FORMER
Filed June 15, 1940
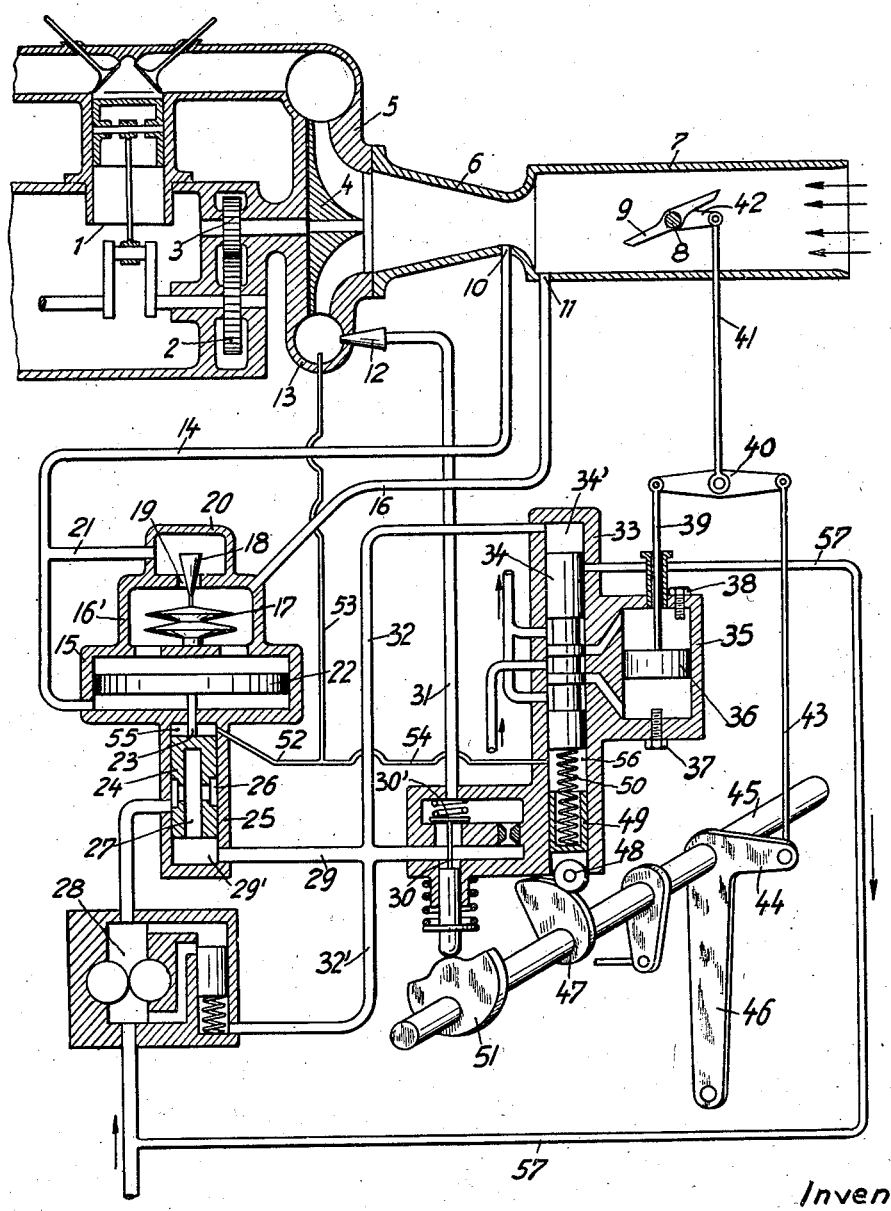
Inventor
Georg Weiche
By  G. A. Oem.
Agent Patented Sept. 28, 1943

2,330,650

UNITED STATES PATENT OFFICE 2,330,650

CHARGE FORMER

Georg Weiche, Berlin-Reinickendorf, Germany; vested in the Alien Property Custodian Application June 15, 1940, Serial No. 340,741
In Germany May 27, 1939

3 Claims. (Cl. 261—50)

This invention relates to a fuel regulator for internal combustion engines and more particularly to a fuel regulating device for aircraft engines operating with fuel injection.

Devices adapted to automatically regulate the fuel injection and the fuel-air ratio are known. The present invention, however, is concerned with a device allowing the injection pressure of the fuel to be adjusted at will by the pilot, whereupon the fuel-air ratio is automatically regulated in dependence on the selected fuel injection pressure.

According to a known construction an instrument measuring the quantity of air fed in a unit of time is arranged in the air intake of the engine. This measuring instrument serves for controlling the amount of fuel to be injected and it measures the weight of the air fed in a unit of time. If a venturi is used as the measuring instrument, then the volume of the air fed in a unit of time is a quadratic function of the effective pressure prevailing between the air pressure in front of the venturi and the pressure at the throat of the venturi where the rate of flow is largest. By additionally influencing the device for measuring the volume of air in dependence on the condition of the air passing through the venturi, the weight of the air fed in a unit of time is determined. The amount of fuel to be injected is proportioned and regulated in accordance with the weight of the air thus determined.

The known construction mentioned above is based upon the knowledge that with a constant density of the air and for a predetermined fuel-air ratio the effective pressure of the venturi is proportional to the pressure difference prevailing at and behind the fuel nozzle. This knowledge is utilized by providing a device responsive to the weight of the air passing through the venturi for influencing a valve controlling the fuel flow. This device is subjected, on the one hand, to the action of the difference in pressure prevailing in the venturi, and on the other hand, to the action of the difference in pressure prevailing at the fuel injecting or spraying nozzle. A control slide connected to this air/pressure responsive device is relieved of the pressure of the fuel pump and is used for controlling the quantity or amount of fuel supplied.

In connection with the above mentioned automatic regulator of the fuel mixture ratio an additional device is provided according to the present invention. This additional device may be actuated by a pilot's hand lever and allows an alteration of the fuel injection pressure and of the weight of the air fed in a unit of time in accordance with the momentarily prevailing requirements—such as take off, cruising, full load, idle running of the airplane. The corresponding alteration of the weight of the air fed in a unit of time is coordinated to this arbitrary alteration of the fuel pressure. This is obtained by the automatic regulation of the mixture of fuel and air. However, according to the present invention a device is provided which prevents an increase of the pressure of the fuel above a predetermined highest pressure.

Besides the regulation of the number of revolutions, the ignition point and so on, the fuel pressure is adjusted by way of a plurality of cams mounted, for instance, upon a shaft actuated by the pilot's hand lever, while simultaneously the weight of the air fed in a unit of time is regulated by a corresponding adjustment of the throttle valve provided in the air intake pipe by way of a leverage connected to the pilot's hand lever. A special piston control slide is provided for actuating a servo motor influencing the leverage connecting the air throttle valve with the pilot's hand lever. This piston control slide is subjected, on the one hand, to the injection pressure produced by the fuel pump and influenced by a cam that is arranged upon the hand lever actuated shaft, an elastic member being interposed between said cam and the piston control slide. The piston control slide, therefore, on the one hand, is influenced by way of the pilot's hand lever and, on the other hand, is subjected to the action of the fuel pressure controlled by the automatically operating regulating device. By adjusting the pilot's hand lever the control slide is, by way of an elastic member, such as a spring, shifted from its middle position until the servo piston has, by means of the throttle valve, adjusted the admission of air in a unit of time in accordance with the selected fuel injection pressure. Simultaneously, the air pressure responsive device adjusts the selected fuel injection pressure so that the control slide is again brought into its middle position and the servo piston comes to rest. If the attitude of flight and therewith the density of air are altered, the control slide and the servo piston are influenced by way of the automatic regulating device in order to change the position of the throttle valve in such a manner that always the same weight of air fed in a unit of time is coordinated to the selected fuel injection pressure and thereby to a definite amount of fuel fed in a unit of time.

With the device according to the present invention the position of the operating or control lever for certain kinds of loading, idle running, cruising, full load, overload, remain equal in all altitudes of flight and may be marked by stationary notches. Another service improvement is obtained if the piston control slide simultaneously serves as a safety valve. This arrangement is advantageous to prevent undesired increases of pressure in the fuel injection pipe system which occur for instance if the load of the engine is suddenly reduced from full load to a lower load.

Instead of the just described regulating device for an automatic regulation an automatically operating device also may be used forming a unit with the fuel injection pressure selector according to the present invention, provided that this automatic regulating device controls the fuel injection pressure in dependence on the weight of the air fed in a unit of time.

Other features of the present invention will be evident from the following specification taken in connection with the accompanying drawing, wherein a construction according to the present invention is diagrammatically shown by way of example.

The engine 1, shown here for the sake of simplicity as a single cylinder engine, drives by way of gears 2 and 3 centrifugal fan 4 of the supercharger 5. Venturi 6 is connected to supercharger 5. Venturi 6 extends into air supply pipe 7 in which throttle valve 9 is pivoted at 8. At the throat of venturi 6 where the rate of flow of air is highest, tapping 10 is provided. A short distance in front of venturi 6 a further tapping 11 is provided in air supply pipe 7 at a point where the air drawn in by the supercharger 5 begins to be compressed. The difference of pressure between tappings 11 and 10 is the effective pressure. Fuel injection nozzle 12 is arranged in the spiral casing of supercharger 5, and behind fuel nozzle 12 another tapping 13 is provided near the point where the fuel injection nozzle 12 discharges the fuel into supercharger casing 5 for determining the pressure prevailing at this point.

Pipe 14 leads from tapping 10 on the venturi 6 to regulator casing 15 and discharges into the lower portion thereof. Pipe 16 leads from tapping 11 into space 16' above casing 15. Barometric box 17 subjected to the condition of air prevailing at tapping 11 is arranged in space 16'. Barometric box 17 is connected to regulating member 18 extending through opening 19 into space 20 arranged above space 16'. When moved under the action of barometric box 17, regulating member 18 may enlarge, reduce or completely close opening 19. Pipe 21 leads from tapping 10 by way of pipe 14 to space 20 to enable the air condition prevailing in space 16' to be influenced, by way of barometric box 17 and the regulating member 18 by the air condition prevailing at the tapping 10.

Piston 22 is arranged in casing 15 and preferably has a circular cross section. The upper surface of piston 22 is influenced by the condition of the air drawn off at 11 and conducted by way of pipe 16 into the space above piston 22. The air pressure may additionally be influenced by way of pipe 21 and space 20, whereas the lower surface of piston 22 is influenced by the pressure prevailing at tapping 10. As both surfaces of piston 22 are acted upon, a definite pressure always is applied to the piston which pressure again is additionally influenced by way of tapping 13 and pipes 52, 53 with a view to correct the pressure applied. Rod 23 is connected to piston 22 and adapted to shift control slide 24 guided in casing 25.

Control slide 24, therefore, is subjected, on the one hand, to the pressure applied to piston 22 and additionally to the correction effected by tapping 13 in supercharger 5 by way of pipes 52, 53 and, on the other hand, to the pressure prevailing in space 29'. These pressures maintain control slide 24 in equilibrium when the pressure in space 29' has reached a predetermined value. This is effected by controlling the feeding pressure of fuel pump 28 in dependence on the pressure prevailing in space 29' and applied by way of pipes 29, 32' to pump 28 until equilibrium between control slide 24 and piston 22 is obtained.

Then the amount of fuel supplied under the regulated pressure flows from the pressure pipe of pump 28 through passage 26 and bore 27 into space 29' and pipe 29. From pipe 29 the fuel then flows through the pressure reducing device 30 and pipe 31 to nozzle 12 by means of which the fuel is injected into supercharger 5. By way of pipe 32 this pressure is conducted to space 34'. Control slide 34, shiftably arranged in casing 33, influences in a well known manner servo piston 36, displaceably mounted in cylinder 35 by the admission of oil under pressure into the space below and above piston 36. The pipes supplying and discharging the oil under pressure are schematically indicated in the drawing by arrows. Two stops 37 and 38 limit the stroke of piston 36.

Piston rod 39 is linked to connecting lever 40 which in turn is pivotally connected to rod 41. Rod 41 is connected to lever 42 for adjusting the throttle valve 9. Rod 43 is connected to connecting lever 40 and rod 43 in turn is linked to one arm 44 of bell crank lever 44, 46 mounted upon shaft 45. The other arm 46 of bell crank lever 44, 46 participates in the movements of the pilot's hand lever not shown in the drawing.

Cam 51 mounted upon shaft 45 influences valve 30' of the pressure reducing device 30. Cam 47 also mounted upon shaft 45 forces by way of roller 48 biassed spring 50 guided in sleeve 49 against control slide piston 34. Connecting pipe system 52, 53, 54, the branch 53 of which discharges at 13 near nozzle 12 into supercharger 5 transmits the pressure fluctuation occurring at 13 upon control slide piston 34.

The device of the invention operates as follows:

If the pilot actuates the pilot's control lever, bell crank lever 44, 46 mounted upon shaft 45 is swung for instance in a clockwise direction. This causes a clockwise rotation of cam 47. Cam 47 now acts by way of roller 48 and sleeve 49 upon tensioned spring 50 bearing against the lower surface of control slide piston 34. The air pressure prevailing at the fuel injection point in supercharger casing 5 and supplied by way of the pipe 54 also acts on the lower surface of control slide piston 34. This air pressure is opposed by the fuel injection pressure applied to the head of piston 34 by way of the pipes 29, 32. Control slide piston 34 now leaves its middle or inoperative position shown in the drawing until the two forces, viz. pressure prevailing in space 34' and pressure exercised by spring 50 as well as the pressure at fuel injection point 13 supplied by way of pipes 53 and 54 are in equilibrium. If the pressure exercised by spring 50 and pipe 54 is preponderating, then the middle portion of piston 34 formed as control slide for actuating servo piston 36 allows the oil under pressure admitted by way of a supply pipe to enter above servo piston 36 and to move it downwardly. Throttle valve 9 then rotates towards its opening direction until the larger effective pressure corresponding to the fuel injection pressure is adjusted and the effective pressure has balanced the selected fuel injection pressure in the fuel regulator. Then piston 34 again occupies its middle or inoperative position and the movement of throttle valve 9 stops.

A change in the attitude of flight and thereby the condition of the ambient air causes an additional control of throttle valve 9 by way of regulating device 15—27, pipes 29—32 as well as space 34'. If throttle valve 9 has reached its fully "open" position, servo piston 36 abuts against limiting stop 37. The increased pressure in venturi 6 resulting from fully opened throttle valve 9 and thereby the coordinated lower fuel injection pressure may be adjusted only as long as the air density coordinated to the desired fuel injection pressure is sufficiently low which may be achieved by a downward movement of the aircraft to a lower altitude of flight. Only then will the fuel injection pressure be constant, a corresponding regulation of throttle valve 9 by means of automatically regulating device 15—27 being effected. The various adjustments of the pilot's control lever, therefore, may remain the same in all altitudes, whereby definite kinds of load, such as idle running economic flight, full load and overload, may be adjusted by engaging the pilot's control lever in stationary notches. To prevent undesired increases of pressure in fuel injection pipe 31, the piston 34 simultaneously is formed as a safety valve so that, if a fuel injection pressure higher than the adjusted fuel pressure occurs, piston 34 is overcontrolled and opens pipe 57, whereby the fuel present in space 34' directly is returned, by way of pipe 57, into the suction pipe of fuel pump 28. Accordingly, the pressure directly drops to the desired degree until throttle valve 9 is adjusted. Also if the engine is adjusted for idle running, the overpressure that suddenly occurs in space 34' forces control piston slide 34 downwards. Therefore, the fuel flows by way of pipe 57 back into the suction pipe of fuel pump 28. Thus an undue supply of fuel causing too rich a mixture is prevented.

What I claim is:

1. In an internal combustion engine, the combination of an air admission pipe having a throttle pivotally mounted therein, a source of fuel supply under substantially constant pressure, said source of fuel supply having a pressure side and a suction side, apparatus for automatically adjusting the air-fuel ratio including a device responsive to the weight of the air passing through said air admission pipe for selecting at will the fuel injection pressure including a pilot's lever, a control device adapted to be controlled by said pilot's lever, a casing, a control slide slidably mounted in said casing and adapted to be actuated by said control device and influenced by said device responsive to the weight of the air and by the pressure of said source of fuel supply as controlled by said apparatus; a spring biased sleeve for keeping said control slide in equilibrium, an instrumentality for controlling said throttle valve by said control slide, said control slide altering the position of said throttle valve until the air fed in a unit of time has a predetermined ratio with respect to the selected fuel pressure and until said control slide is simultaneously returned into its inoperative position a fuel supply by-pass through said casing, and a valve for said by-pass operable by the control slide in further maintaining a fuel-air-flow ratio.

2. A device as claimed in claim 1 wherein a relief pipe is provided connecting said casing with the suction side of said source of fuel supply so that when the pressure of said fuel supply source as controlled by said apparatus exceeds a predetermined amount said control slide opens said relief pipe, whereby over control of said fuel injection pressure selecting mechanism is prevented.

3. A device as claimed in claim 1 wherein said instrumentality for controlling said throttle valve by said control slide includes a servo motor controlled by said control slide for actuating said throttle valve.

GEORG WEICHE.